(12) United States Patent
Ren et al.

(10) Patent No.: US 8,329,040 B2
(45) Date of Patent: Dec. 11, 2012

(54) METHOD FOR REMOVING AMMONIA NITROGEN IN COKING WASTEWATER

(75) Inventors: Hongqiang Ren, Nanjing (CN); Lili Ding, Nanjing (CN); Tao Zhang, Nanjing (CN)

(73) Assignee: Nanjing University (CN)

( * ) Notice: Subject to any disclaimer, the term of this patent is extended or adjusted under 35 U.S.C. 154(b) by 370 days.

(21) Appl. No.: 12/672,095

(22) PCT Filed: Jul. 25, 2008

(86) PCT No.: PCT/CN2008/001372
§ 371 (c)(1),
(2), (4) Date: Feb. 4, 2010

(87) PCT Pub. No.: WO2009/024014
PCT Pub. Date: Feb. 26, 2009

(65) Prior Publication Data
US 2011/0203998 A1 Aug. 25, 2011

(30) Foreign Application Priority Data
Aug. 21, 2007 (CN) .......................... 2007 1 0130863

(51) Int. Cl.
*B01D 21/00* (2006.01)
*C02F 1/52* (2006.01)
(52) U.S. Cl. ......... 210/710; 210/711; 210/723; 210/724
(58) Field of Classification Search .................. 210/702, 210/710, 711, 712, 713, 716, 717, 718, 723, 210/724, 725, 738
See application file for complete search history.

(56) References Cited

FOREIGN PATENT DOCUMENTS

| CN | 1623924 | | 8/2005 |
|----|---------|---|--------|
| CN | 1884116 | | 12/2006 |
| EP | 0490396 | | 3/1996 |
| JP | 52004649 | | 1/1997 |
| JP | 2001104966 | A * | 4/2001 |
| JP | 2004174332 | A * | 6/2004 |
| WO | 2009024014 | | 2/2009 |

OTHER PUBLICATIONS

He et al., "Repeated use of MAP decomposition residues for the removal of high ammonium concentration from landfill leachate", Chemosphere 66 (2007) 2233-2238.*
Uludag-Demirer et al., "Ammonia removal from anaerobically digested dairy manure by struvite precipitation", Process Biochemistry 40 (2005) 3667-3674.*
Lee et al., "Removal of nitrogen and phosphate from wastewater by addition of bittern", Chemosphere 51 (2003) 265-271.*
Diwani et al., "Recovery of ammonia nitrogen from industrial wastewater treatment as struvite slow releasing fertilizer", Desalination 214 (2007) 200-214.*
Shilong He, et al. Repeated Use of MAP decomposition residues for the removal of high ammonium concentration from landfill leachate. Chemosphere Feb. 2007, vol. 66, pp. 2233-2238.
National Standard of the People's Republic of China, GB 8978-1996, "Integrated Water Discharge Standard", 35 pages.
Sell, et al. "Removing Color and Chlorinated Organics From Pulp Mill Bleach Plant Effluents by Use of Flyash"; Available online Jul. 7, 2003.
Shendea, et al. "Use of Fly Ash in Reducing Heavy Metal Toxicity to Plants", Available online Jul. 7, 2003.

* cited by examiner

*Primary Examiner* — Christopher Upton
*Assistant Examiner* — Nader Hossaini
(74) *Attorney, Agent, or Firm* — Schmeiser, Olsen & Watts, LLP

(57) ABSTRACT

A new method for removing ammonia nitrogen in coking wastewater is disclosed in this invention. It comprises steps as follow: introducing coking wastewater into a reaction pool into which magnesium and phosphate are added; adding sodium hydroxide to regulate the PH of the mixture around 9.0-10.5; separating the supernatant and the precipitate after proper agitation and natural precipitation; dehydrating the precipitate and then adding alkaline fly ash, water to the dehydrated precipitate and stirring the mixture; decomposing the mixture with heating and absorbing the ammonia gas thereof produced with acidic solution. In consideration of high concentration of ammonia nitrogen in coking wastewater, this invention aims at quick and efficient treatment. The concentration of ammonia nitrogen in treated water meets the highest discharge standard stipulated in [China National] *Integrated Wastewater Discharge Standard* (GB8978-96). Meanwhile, this invention provides a new way for beneficial utilization of the alkaline fly ash as well. The chemicals adopted for wastewater precipitation in this invention can be recovered for recyclable use, which consequently cuts down the total cost of the wastewater treatment.

7 Claims, No Drawings

METHOD FOR REMOVING AMMONIA NITROGEN IN COKING WASTEWATER

FIELD OF INVENTION

This invention relates to a method of coking wastewater treatment, specifically, of removing ammonia nitrogen in coking wastewater.

DESCRIPTION OF RELATED ART

Coking wastewater is an organic wastewater emerging in large quantity during such processes as coal coking, purification of coal gas and recovery of coking byproducts. It contains high concentration of ammonia nitrogen and other toxic chemicals such as coke tar, benzenes, phenols, fluorides and sulfides. Large quantity and complicate quality characterize coking wastewater and make it very difficult to deal with.

The high concentration of ammonia nitrogen in coking wastewater stands as a constant challenge for wastewater treatment. Basically, there are two categories of treatment: biological methods and physiochemical methods. The biological methods are featured with lower operating cost and easier management. However, they can only be adopted when the concentration of ammonia nitrogen is fairly low, for the high-concentration ammonia nitrogen often inhibits biological reaction. On the contrary, physiochemical methods show more advantages in treating wastewater with high-concentration ammonia nitrogen.

Amongst the existing techniques of removing ammonia nitrogen in coking wastewater are air stripping, break point chlorination, membrane absorption, and chemical precipitation. When air stripping is adopted in removing ammonia nitrogen in wastewater, air is pumped into wastewater in order to transform free ammonia dissolving in water into its gas state. The wastewater consequently is stripped of ammonia because ammonia nitrogen has escaped from water into air. The limitation of this technique is that on the one hand it cannot lower the concentration of ammonia nitrogen down to a desirable degree because of its poor performance when the concentration is in a low level, and on the other hand it requires being conducted under alkaline condition, which means acid should be added after stripping in order to adjust the PH back to neutral condition. Therefore, this technique is not popular in this field. When break point chlorination is adopted, chlorine, rather than air, is pumped into wastewater till the free chlorine in water reaches its lowest level. The mechanism of this technique is that chlorine can be used to combine free ammonia to form harmless nitrogen. The limitation of this technique is that there is leftover chlorine in water after treatment, which needs further procedures to remove it. Therefore, this technique is also not suited for wide application. Membrane absorption is a newly developed technique in which both membrane separation and membrane absorption mechanisms are utilized. This technique enjoys high efficiency in treating wastewater but it requires strict pre- and routine treatment of raw water in order to avoid contamination and silting-up of the to membrane. This results higher management cost and inconvenience in operation, therefore, like other two aforesaid techniques, it is not suitable for the large-scale water treatment project.

Chemical precipitation, specifically MAP technique, is the most widely used technique in removing ammonia nitrogen in coking wastewater. The basic mechanism of this technique is to remove ammonia nitrogen by adding magnesium and phosphate into wastewater, which combine ammonia nitrogen in wastewater to form magnesium ammonium phosphate [MAP]. Ammonia nitrogen therefore is removed from wastewater.

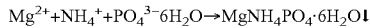

$$Mg^{2+}+NH_4^{+}+PO_4^{3-}6H_2O \rightarrow MgNH_4PO_4 \cdot 6H_2O\downarrow$$

This technique is featured with simple procedures and easy operation management. However, the high price of chemicals restricts its extensive application.

Chinese Patent CN 1623924A discloses a method for recyclable use of some chemicals. The precipitate MAP produced during precipitation is treated with heating (namely, pyrolysis), when temperature reaches 150-300° C., preferably 200-250° C., MAP begins decomposing and releases ammonia gas. The decomposed product, magnesium hydrogen phosphate, can be again reused in next precipitation process to combine free ammonia in wastewater. This consequently partly reduces expenditure on chemical agents.

Kenichi, Kaoru, and et al. from Japan disclose a method in which sodium hydroxide is added into the precipitate MAP and then treated with pyrolysis (temperature 70-80° C.), ammonia gas comes out and the decomposed product can be reused for next round of wastewater treatment; Bings and Lehmkuhl from Germany also add sodium hydroxide into the precipitate MAP but they keep heating temperature around 80-150° C. (Kenichi E, Kaoru I, and et, al. "Ammonia Removal from Wastewaters." *Japan Kokai* 77 04 649, Appl, 75/80, 1975, 538; Bings H, Lehmkuhl J, "Process for recovery of ammonia from process and waste waters." *Eur. Pat*, Appl, EP490, 396). These two methods do reduce the pyrolysis temperature of MAP and shorten the pyrolysis time, which means reducing the total energy consumption. But, using sodium hydroxide as an auxiliary in MAP pyrolysis further increases expenditure on chemical agents.

Fly ash is a kind of solid grain byproduct of coal burning. Its loose, porous structure and comparatively large surface area endow itself with certain activity. As we know, China is a country notorious for its huge consumption of coal. Each year, nearly 100 million tons of fly ash is disposed as waste material, only a small portion of which is put into integrated utilization. Without proper treatment, the large amount of fly ash may cause dusty weather in windy days and pollute the air. If directly dumped into water without proper treatment, it may obstruct the river and the toxic materials in it may do harm to both human beings and the biosystem as a whole. Therefore, it is a worthwhile issue to discuss how to realize the beneficial utilization of fly ash in relation to its features. As some researchers have shown, alkaline fly ash (alkaline fly ash) has already been used to eliminate heavy metals in wastewater or to purify the air (Shende A, Juwarkar A. S, and et, al. "Use of fly ash in reducing heavy metal toxicity to plants." *Resour. Conserv. Recov.*, 1994, 12: 221~228; Sell N J, Norman J C, and et, al. "Removing color and chlorinated organics from pulp mill bleach plant effluent by use of fly ash." *Resour. Conserv. Recov.*, 1994, 10: 279~299). However, as far as pyrolysis of MAP is concerned, no documents or patents concerning both research and utilization of alkaline fly ash have been disclosed.

DETAILED DESCRIPTION OF THE INVENTION

1. Technical Problems to be Solved

In consideration of problems in currently existing techniques, this invention discloses a new method for removing ammonia nitrogen in coking wastewater. With adding fly ash into MAP during its pyrolysis process, this method on the one hand lowers down MAP's pyrolysis temperature, expedites its pyrolysis time and improves the efficiency of ammonia gas release, and on the other hand cuts down on expenditure on sodium hydroxide that is required for conventional techniques for decomposing MAP and reaches the goal of beneficial utilization of alkaline fly ash. Meanwhile, since chemicals (magnesium and phosphate) added into the wastewater during removal of ammonia nitrogen can be reused in next round of precipitation, the expenditure on chemical agents is further lowered down.

2. Technical Details in this Invention

The technical details of this invention include:

A method for removing ammonia nitrogen in coking wastewater comprises:

Step (1): introducing coking wastewater into a reaction pool; adding magnesium and phosphate into the pool with the mole ratio of magnesium:phosphate:ammonia nitrogen=0.8-1.5:0.7-1.2:1.0; then, adding sodium hydroxide to regulate the PH of the mixture around 9.0-10.5; separating the supernatant and the precipitate after proper agitation and natural precipitation;

Step (2): dehydrating the precipitate and then adding alkaline fly ash [AFA] to the dehydrated precipitate [magnesium ammonium phosphate, MAP] with the weight ratio of MAP:AFA=10:1-4; adding water to the mixture and stirring it, then decomposing it with heating (time 1-4 h; temperate 70-130° C.);

Step (3): absorbing the ammonia gas produced in Step 2 with acidic solution.

The solid substance emerged after the pyrolysis described in Step (2) is a mixture of magnesium hydrogen phosphate, magnesium orthophosphate, sodium magnesium phosphate and potassium magnesium phosphate. It can be reused in next round of wastewater treatment, and again forms the precipitate MAP. The goal of recyclable use of chemical agents is therefore realized. The weight ratio of the solid substance reused in a second round of wastewater treatment and ammonia nitrogen in the wastewater is 15-30:1. Meanwhile, acidic solution is adopted to absorb ammonia gas released during pyrolysis for further beneficial utilization.

Magnesium applied in Step (1) can be magnesium chloride, magnesium sulfate or magnesium oxide while phosphate can be sodium phosphate, potassium phosphate, disodium hydrogen phosphate, dipotassium hydrogen phosphate, sodium dihydrogen phosphate or potassium dihydrogen phosphate. After both magnesium and phosphate are added into coking wastewater, agitate the mixture in order that ammonia nitrogen in wastewater can combine with magnesium and phosphate to form the precipitate MAP. After natural precipitation, separate the precipitate MAP from the supernatant. The agitation time in Step (1) is 20-50 minutes while the time for natural gravity precipitation is 30-90 minutes.

The mixing and stirring time in Step (2) is 20-30 minutes; then start pyrolysis of MAP, during which the heating time is controlled within 1-4 hours while temperature 70-130° C., preferably 80~110° C.

The alkaline fly ash used in Step (2) is a type of fly ash with high PH (ph>12). Adding alkaline fly ash into MAP can expedite pyrolysis of MAP in that the alkaline fly ash can effectively reduce MAP's pyrolysis temperature and time. This in turn reduces total consumption of thermal energy and total operation expenditure. The efficiency of ammonia gas release in this method is improved as well.

3. Beneficial Effects

This invention presents a new method for removing ammonia nitrogen in coking wastewater. In consideration of the high concentration of ammonia nitrogen in this kind of wastewater, it aims at quick and efficient treatment. The concentration of ammonia nitrogen in treated water meets the highest discharge standard stipulated in [China National] *Integrated Wastewater Discharge Standard* (GB8978-96). Meanwhile, this invention provides a new way for beneficial utilization of alkaline fly ash as well. It further provides a method for recovery and reuse of chemical agents used in precipitation process, which consequently reduces expenditure of wastewater treatment as a whole.

DETAILED DESCRIPTION OF SPECIFIC EMBODIMENTS

Embodiment 1

The concentration of ammonia nitrogen in coking wastewater is 400 mg/l and the water is led into the reaction pool. Adding magnesium chloride and disodium hydrogen phosphate into the wastewater and making the mole ratio of all components be magnesium:phosphate:ammonia nitrogen=1.0-1.2:0.7-0.9:1.0; adding sodium hydroxide to make the PH of whole reaction system reach 10.0-10.5; agitating the mixture for 30 minutes and leaving it for natural gravity precipitation for 60 minutes; separating the supernatant and the precipitate; dehydrating the precipitate to get MAP; adding alkaline fly ash [AFA] into MAP and keeping the weight ratio of these two component around MAP:AFA=10:1.0-2.0; mixing and stirring these two components with an appropriate amount of water (enough for evenly mixing the two components) for 20 minutes; starting pyrolysis of MAP around 80-100° C. for 1.5-2 hours and absorbing the released ammonia gas with dilute sulfuric acid solution (0.1-0.5 mol/1) for other use. The solid substance produced during pyrolysis can be reused in another round of wastewater treatment with weight ratio to of the substance:ammonia nitrogen in coking wastewater=20-25:1. The concentration of ammonia nitrogen in wastewater after being treated with this method meets the highest standard stipulated in [China National] *Integrated Wastewater Discharge Standard* (GB8978-96).

Embodiment 2

The concentration of ammonia nitrogen in coking wastewater is 200 mg/l and the water is led into the reaction pool. Adding magnesium sulfate and trisodium phosphate into the wastewater and making the mole ratio of all components be magnesium:phosphate:ammonia nitrogen=1.2-1.4:0.8-1.0:1.0; adding sodium hydroxide to make the PH of whole reaction system reach 9.5-10.0; agitating the mixture for 40 minutes and leaving it for natural gravity precipitation for 75 minutes; separating the supernatant and the precipitate; dehydrating the precipitate to get MAP; adding alkaline fly ash [AFA] into MAP and keeping the weight ratio of these two component around MAP:AFA=10:2.0-2.5; mixing and stirring these two components with an appropriate amount of water (enough for evenly mixing the two components) for 30 minutes; starting pyrolysis of MAP around 90-110° C. for 2-2.5 hours and absorbing the released ammonia gas with phosphoric acid solution (1.6-2.0 mol/l). The solid substance produced during MAP pyrolysis can be reused in another round of wastewater treatment with weight ratio of the substance:ammonia nitrogen in coking wastewater=20-25:1. The concentration of ammonia nitrogen in wastewater after being treated with this method meets the highest standard stipulated in [China National] *Integrated Wastewater Discharge Standard* (GB8978-96).

Embodiment 3

The concentration of ammonia nitrogen in coking wastewater is 1600 mg/l and the water is led into the reaction pool. Adding magnesium oxide and potassium dihydrogen phosphate into the wastewater and making the mole ratio of all components be magnesium:phosphate:ammonia nitrogen=1.3-1.5:1.0-1.2:1.0; adding sodium hydroxide to make the PH of whole reaction system reach 9.0-9.5; agitating the mixture for 25 minutes and leaving it for natural gravity precipitation for 40 minutes; separating the supernatant and the precipitate; dehydrating the precipitate to get MAP; adding alkaline fly ash [AFA] into MAP and keeping the weight ratio of these two component around MAP:AFA=10:3.5-4.0; mixing and stirring these two components with an appropriate amount of water (satisfied for evenly mixing the two components) for 25 minutes; starting pyrolysis of MAP around 110-130° C. for 1-1.5 hours and absorbing the released ammonia gas with dilute hydrochloric acid solution (0.6-1.0 mol/l). The solid substance produced during MAP pyrolysis can be reused in another round of wastewater treatment with weight ratio of the substance:ammonia nitrogen in coking wastewater=15-20:1. The concentration of ammonia nitrogen in wastewater after being treated with this method meets the highest standard stipulated in [China National] *Integrated Wastewater Discharge Standard* (GB8978-96).

Embodiment 4

The concentration of ammonia nitrogen in coking wastewater is 700 mg/l and the water is led into the reaction pool. Adding magnesium chloride and dipotassium hydrogen phosphate into the wastewater and making the mole ratio of all components be magnesium:phosphate:ammonia nitrogen=0.8-1.1:0.8-1.0:1.0; adding sodium hydroxide to make the PH of whole reaction system reach 9.0-9.5; agitating the mixture for 50 minutes and leaving it for natural gravity precipitation for 30 minutes; separating the supernatant and the precipitate; dehydrating the precipitate to get MAP; adding alkaline fly ash [AFA] into MAP and keeping the weight ratio of these two component around MAP:AFA=AFA=10:3.0-3.5; mixing and stirring these two components with an appropriate amount of water (satisfied for evenly mixing the two components) for 30 minutes; starting pyrolysis of MAP around 70-90° C. for 3-4 hours and absorbing the released ammonia gas with dilute hydrochloric acid solution (1.1-1.5 mol/l). The solid substance produced during MAP pyrolysis can be reused in another round of wastewater treatment with weight ratio of the substance:ammonia nitrogen in coking wastewater=20-25:1. The concentration of ammonia nitrogen in wastewater after being treated with this method meets the highest standard stipulated in [China National] *Integrated Wastewater Discharge Standard* (GB8978-96).

Embodiment 5

The concentration of ammonia nitrogen in coking wastewater is 1200 mg/l and the water is led into the reaction pool. Adding magnesium sulfate and sodium dihydrogen phosphate into the wastewater and making the mole ratio of all components be magnesium:phosphate:ammonia nitrogen=1.1-1.3:0.8-1.1:1.0; adding sodium is hydroxide to make the PH of whole reaction system reach 9.5-10.0; agitating the mixture for 20 minutes and leaving it for natural gravity precipitation for 90 minutes; separating the supernatant and the precipitate; dehydrating the precipitate to get MAP; adding alkaline fly ash [AFA] into MAP and keeping the weight ratio of these two component around MAP:AFA=10:2.0-3.0; mixing and stirring these two components with an appropriate amount of water (satisfied for evenly mixing the two components) for 20 minutes; starting pyrolysis of MAP around 80-90° C. for 2.5-3 hours and absorbing the released ammonia gas with dilute sulfuric acid solution (1.1-1.5 mol/l). The solid substance produced during MAP pyrolysis can be reused in another round of wastewater treatment with weight ratio of the substance:ammonia nitrogen in coking wastewater=25-30:1. The concentration of ammonia nitrogen in wastewater after being treated with this method meets the highest standard stipulated in [China National] *Integrated Wastewater Discharge Standard* (GB8978-96).

Embodiment 6

The concentration of ammonia nitrogen in coking wastewater is 900 mg/l and the water is led into the reaction pool. Adding magnesium chloride and tripotassium phosphate into the wastewater and making the mole ratio of all components be magnesium:phosphate:ammonia nitrogen=1.0-1.3:1.1-1.2:1.0; adding sodium hydroxide to make the PH of whole reaction system reach 10.0-10.5; agitating the mixture for 35 minutes and leaving it for natural gravity precipitation for 50 minutes; separating the supernatant and the precipitate; dehydrating the precipitate to get MAP; adding alkaline fly ash [AFA] into MAP and keeping the weight ratio of these two component around MAP:AFA=10:2.5-3.5; mixing and stirring these two components with an appropriate amount of water (satisfied for evenly mixing the two components) for 25 minutes; starting pyrolysis of MAP around 90-100° C. for 3.5-4 hours and absorbing the released ammonia gas with dilute hydrochloric acid solution (1.6-2.0 mol/l). The solid substance produced during MAP pyrolysis can be reused in another round of wastewater treatment with weight ratio of the substance:ammonia nitrogen in coking wastewater=20-25:1. The concentration of ammonia nitrogen in wastewater after being treated with this method meets the highest standard stipulated in is [Chinese State] *Integrated Wastewater Discharge Standard* (GB8978-96).

The invention claimed is:

1. A method for removing ammonia nitrogen in coking wastewater comprises:
    Step (1): introducing coking wastewater into a reaction pool; adding magnesium and phosphate into the pool with the mole ratio of magnesium:phosphate:ammonia nitrogen=0.8-1.5:0.7-1.2:1.0; then, adding sodium hydroxide to regulate the PH of the mixture to 9.0-10.5; separating a supernatant and a precipitate after proper agitation and natural precipitation;
    Step (2): dehydrating the precipitate in Step (1) and then adding alkaline fly ash to a dehydrated precipitate with the weight ratio of MAP:AFA=10:1-4; adding water to the mixture and stirring it, then decomposing it with heating;
    Step (3): absorbing an ammonia gas produced in Step (2) with acidic solution.

2. A method for removing ammonia nitrogen in coking wastewater as described in claim 1, wherein a solid substance produced during pyrolysis in Step (2) is reused in another round of wastewater treatment, wherein the weight ratio of the solid substance and ammonia nitrogen in coking wastewater is 15-30:1.

3. The method for removing ammonia nitrogen in coking wastewater as described in claim 2, wherein magnesium in Step (1) is selected from the group consisting of: magnesium chloride, magnesium sulfate or magnesium oxide while phosphate can be sodium phosphate, potassium phosphate, disodium hydrogen phosphate, dipotassium hydrogen phosphate, sodium dihydrogen phosphate, and potassium dihydrogen phosphate.

4. The method for removing ammonia nitrogen in coking wastewater as described in claim 3, wherein the agitation time in Step (1) is 20-50 minutes while the time for natural gravity precipitation is 30-90 minutes.

5. The method for removing ammonia nitrogen in coking wastewater as described in claim 3, wherein the time of mixing and stirring in Step (2) is 20-30 minutes; during the pyrolysis thereafter, the heating time is controlled within 1-4 hours while temperature 70-130° C.

6. The method for removing ammonia nitrogen in coking wastewater as described in claim 5, wherein the temperature of pyrolysis in Step (2) is controlled within 80-110° C.

7. The method for removing ammonia nitrogen in coking wastewater as described in claim 1, wherein the acidic solution for absorbing ammonia gas is made from at least one of hydrochloric acid, sulfuric acid, and or phosphoric acid, the concentration of which is controlled to 0.1 mol/l ~2.0 mol/l.

* * * * *